United States Patent [19]
Kopp

[11] 3,884,622
[45] May 20, 1975

[54] METHOD AND APPARATUS FOR POLYMERIZING MOLDED DENTAL PIECES

[76] Inventor: Erich Kopp, Panoramaweg 15, 7293 Pfalzgrafenweiler, Germany

[22] Filed: Aug. 7, 1973

[21] Appl. No.: 386,483

[30] Foreign Application Priority Data
   Oct. 17, 1972   Germany............................ 2250819

[52] U.S. Cl. ...................... 432/24; 34/15; 432/205
[51] Int. Cl. ............................................. F27b 5/04
[58] Field of Search .......... 432/250, 203, 204, 205, 432/253, 255, 120, 24; 34/15

[56] References Cited
UNITED STATES PATENTS

| | | | |
|---|---|---|---|
| 2,586,862 | 2/1952 | Records.......................... | 432/120 X |
| 2,718,709 | 9/1955 | Ford .................................. | 34/15 X |
| 3,151,851 | 10/1964 | Negley.............................. | 432/205 |

Primary Examiner—John J. Camby
Attorney, Agent, or Firm—Markva & Smith

[57] ABSTRACT

A method and apparatus useful for effecting the matrix-free polymerization of molded dental pieces under elevated temperature and pressure. The apparatus includes a hermetically sealable polymerization chamber into which the molded dental pieces are placed. The temperature is elevated within the chamber. The pressure is raised within the chamber after it has been hermetically sealed. A sufficient amount of water is supplied within the polymerization chamber to form an unsaturated water vapor atmosphere in the chamber while under increased temperature and pressure. After effecting polymerization for a predetermined amount of time, the chamber is exhausted while it remains hermetically sealed. Means is provided for effecting fluid flow into and out of the chamber while it is hermetically sealed.

35 Claims, 8 Drawing Figures

METHOD AND APPARATUS FOR POLYMERIZING MOLDED DENTAL PIECES

BACKGROUND OF THE INVENTION

The invention concerns a method and apparatus for effecting the matrix-free polymerization of molded dental pieces under elevated temperature and pressure. A hermetically sealable pressure pot or chamber is heated by a heating device up to temperatures of more than 100° C. There are numerous known prior art methods and devices for forming molded dental pieces. For example, powder and liquid synthetics may be mixed with each other, pressed into a plaster mold and subsequently hardened in a water bath. This prior art process is very clumsy and time consuming.

According to another well known method, a mixture of synthetics is applied directly upon the basic model, is free molded, and is hardened without a matrix in a hot air chamber at a temperature of 130° C without pressure. It has been found that the hardened model is not satisfactory with respect to quality because the molded piece contains chemical and physical values which are unsatisfactory. This may be attributed to the absence of pressure and water during the polymerization process.

In another prior art process, the synthetic mixture is applied free, is molded and is processed without a matrix. The molded piece is then put into a liquid bath such as glycerin or glycol alcohol which simmers at temperatures of over 100°C. Thereafter the liquid bath is put under pressure. Generally a working temperature of 110°C is selected. This process has the disadvantage that, during polymerization, the bath liquid diffuses such as under a synthetic layer in the case of applied crowns. That is, the liquid penetrates between the metal base and the synthetic layer and thus leads to a discoloration of the end product.

In another prior art process, a heat transmission medium and the synthetic material is hardened under pressure. However, this process requires a comparatively long period of time for hardening because the polymerization is conducted at temperatures of about 95° C for safety reasons. It would, of course, be possible in principle to raise the temperature above 100° C by polymerization under pressure and in a water bath. But then one is compelled, after termination of the polymerization period, to conduct cooling under pressure which requires a considerable period of time. If the pressurized container is opened without cooling, a sudden vaporization of the water takes place with an explosion-like effect.

It is known that molded dental pieces can be placed in a pressure chamber or pot that is set at a pressure of four to five gauge atmospheres. The chamber is then heated so that the molded detal pieces can harden. A thermometer and a manometer are provided for monitoring the atmospheric conditions within the chamber. This apparatus is used in conjunction with a dry polymerization process which has the disadvantage that the synthetic dries up too much. Therefore, polymerized products produced in this manner subsequently swell up in the mouth. This is especially true in the production of synthetic veneer or jacket crowns. That is, the synthetic becomes detached at the stage boundary which leads to ugly discoloration.

It has been proposed to inject an atomized liquid agent into the pressure chamber for the removal of exothermal heat. Under this condition, it is necessary to provide a large outlay for equipment to atomize the liquid agent under pressure into the pressure chamber. Nozzles are required to accomplish this and the pressure of the gas which entrains the liquid agent during polymerization must be higher than the pressure within the pressure chamber. The resultant structure is extremely complicated and expensive to operate.

PURPOSE OF THE INVENTION

The primary object of this invention is to simplify and automate the polymerization process in the production of molded dental pieces.

A further object of this invention is to overcome the disadvantages associated with prior art processes and apparatus with a minimum of outlay for equipment, permit short polymerization periods, avoid the disadvantages of dry polymerization and use a minimum amount of operating materials.

SUMMARY OF THE INVENTION

The invention as disclosed herein includes an apparatus having a hermetically sealable polymerization chamber. The temperature is elevated within the chamber by a heating means and the pressure is raised within the chamber after it has been hermetically sealed. A sufficient amount of water is supplied to the polymerization chamber to form an unsaturated water vapor atmosphere is the chamber after it has been hermetically sealed under increased temperature and pressure. Means is provided for exhausting the chamber after effecting polymerization for a predetermined amount of time while the chamber remains hermetically sealed. Flow means enables fluid to pass into and out of the chamber after it has been hermetically sealed.

In one specific embodiment, an insertion device is located in the chamber and includes a bottom portion for supporting the molded pieces and a handle portion attached to the bottom portion. The water supply means includes at least one recess in the bottom portion for containing the desired amount of water to effect the unsaturated water vapor atmosphere within the pressure chamber.

In another embodiment, the water supply means includes a water container disposed at a location outside the polymerization chamber. The fluid flow means includes a flow regulator means, two reversing interrupter valves and a main line extending from the polymerization chamber to a first said reversing interrupter valve which includes two intake connections. One of the intake connections is attached to the water container and the other intake connection is attached to a compressed air line which is connected to a compressed air source. A second reversing interrupter valve is disposed within the compressed air line. The second reversing interrupter valve includes a first intake connection from the compressed air source, a second connection to the branch line which extends to the first reversing interrupter valve and a third connection to the exhausting means. The first and second reversing interrupter valves are controllable by the time control of the flow regulator means.

Various other features of the invention are discussed hereinbelow.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
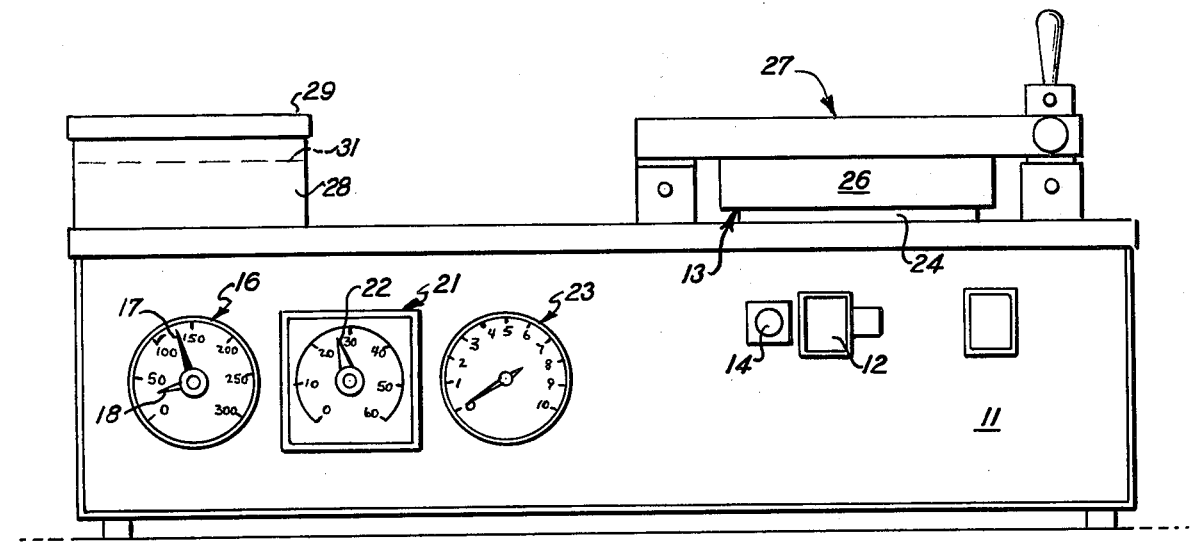
FIG. 1 is a front elevational view of an apparatus made in accordance with this invention.

More specifically, the apparatus as shown in FIGS. 1 through 4 includes a pressure pot 13 forming a chamber, a water container 28 and a control assembly. Control button 12 is mounted on a front plate 11 and is used to electrically turn on a heating sleeve (not shown) which is heating the pressure pot 13. A second button 14 mounted on the frontal plate 11 is used to initiate further processes to be described hereinbelow. A temperature selector 16 mounted at the left of the frontal plate 11 includes pointers 17 and 18. Pointer 17 indicates the desired temperature in the pressure pot 13 and pointer 18 indicates the actual temperature.

A thermostat 19 is mounted in the pressure pot 13 and switches the heating sleeve (not shown) on or off depending upon whether the desired temperature is above or below the actual temperature as shown on the temperature selector 16. The temperature selector 16 is connected to the thermostat 19 in any conventional manner.

Switch clock, generally designated 21, is mounted on the frontal plate 11 and includes hands 22 which can be set for a desired polymerization period. A pressure indicator 23 is mounted on the frontal plate 11 to the right of the switch clock 21 and shows the prevailing pressure existing in the pressure pot 13 during operation of the apparatus.

The pressure pot 13 can be closed by the lid 26 which operates in conjunction with the locking device, generally designated 27. This combination of lid 26 and locking device 27 may be constructed in any known manner.

Figure 2:
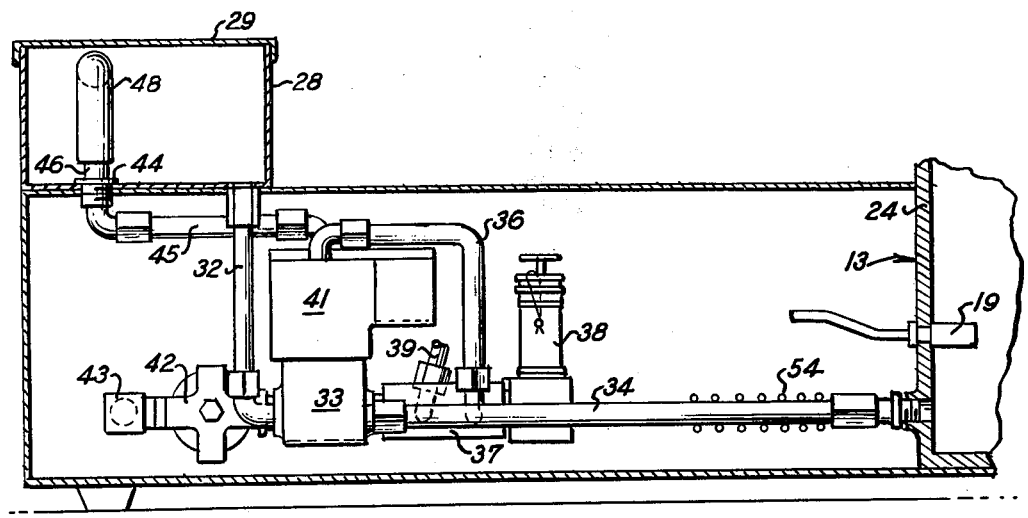
FIG. 2 is a schematic elevational view of the apparatus of FIG. 1 with the left portion of the frontal plate removed.

The water container 28 is fixedly mounted at the end of the apparatus opposite the pressure pot 13. Lid 29 having an overlapping edge is used to close the water container 28. The container 28 has a capacity of several liters of water when the water surface 31 is at the indicated level. As shown in FIG. 2, a drain pipe 32 is mounted at the bottom of the container 28 and leads to a first magnetic valve 33. The pressure resistant water-air-steam line 34 leads to and discharges into a sidewall of the pressure pot 13. The volume of the water-air-steam line 34 is sufficiently large so that it can take up either the entire water volume or at least a major portion thereof, that is required later in the form of steam for the polymerization process.

A pressure resistant air-steam line 36 also originates from magnetic valve 33 and leads to a distributor piece 37. A safety valve 38 is connected to one side of the distributor piece 37 and a hose 39 is connected to another side of the distributor piece 37 and leads to the pressure indicator 23. A second magnetic valve 41 is connected to the distributor piece 37 as shown in FIG. 3.

The magnetic valve 41 is connected upstream to a pressure reducer 42 which, in turn, is connected to a compressed air connection 43. The compressed air connection 43 protrudes from the rear wall of the apparatus and can be connected with any available compressed air source.

Magnetic valve 41 is also connected to the pressure resistant steam line 45 which traverses the bottom of the water container 28 and then is rerouted by 90° as shown in FIG. 2 through the bushing 44. The steam line 45 runs into an outlet means comprising a pipe section 46 extending above the water level 31. The pipe section 46 is pinched off at its end and includes holes 47. A transparent synthetic hose 48 has a considerably larger diameter than the pipe section 46 and is open at both of the ends. The transparent synthetic hose 48 is slipped over the pipe section 46.

Figure 3:
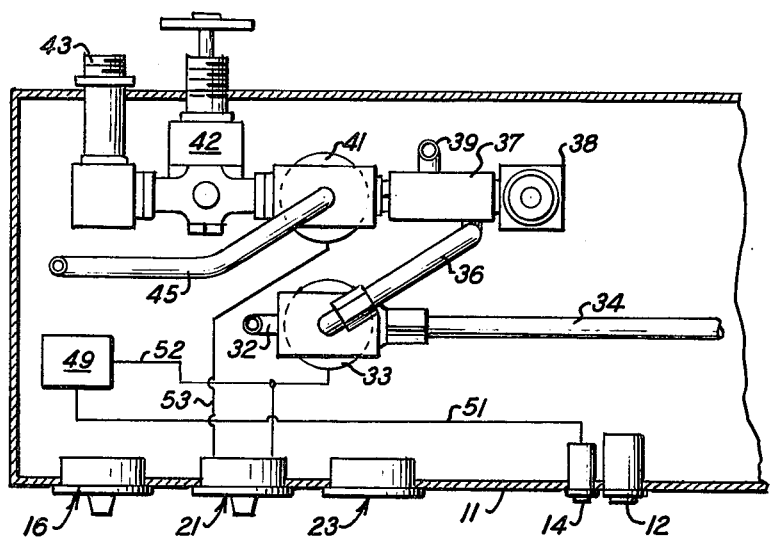
FIG. 3 is a schematic top cross-sectional view of the apparatus of FIG. 1.
Figure 4:
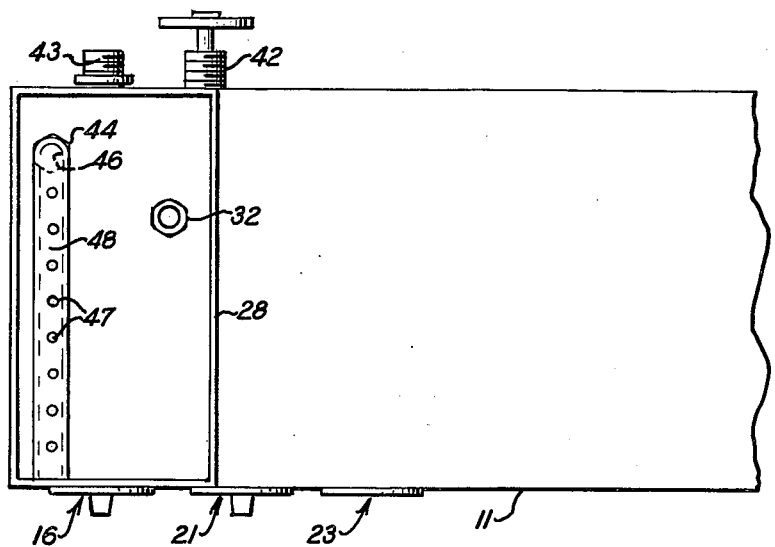
FIG. 4 is a partial top view of the apparatus of FIG. 1 with the lid of the water container removed.
Figure 5:
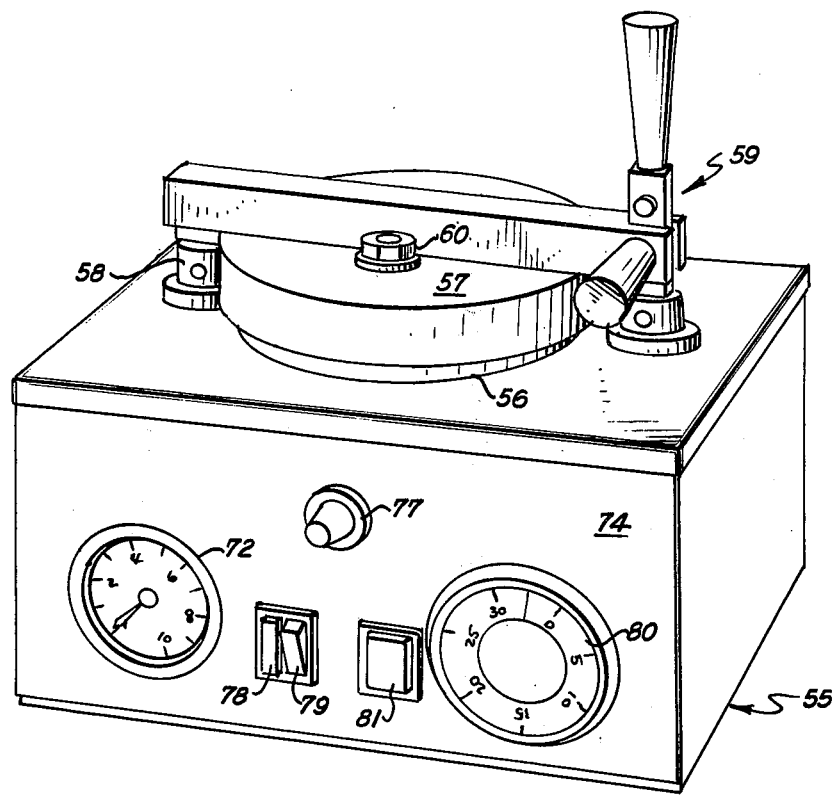
FIG. 5 is a perspective view of another apparatus made in accordance with this invention.

A timing relay 49 is mounted within the apparatus to the left of magnetic valve 33 as shown in FIG. 3. The timing relay 49 may be set at 0 to 10 seconds. Control button 14, clock 21 and control lines 51, 52 and 53 are interconnected to control the magnetic valves 33 and 41.

The apparatus as shown in FIGS. 1 through 4 operates as follows:

The pointer 17 of temperature selector 16 is first set at the desired polymerization temperature which is dependent upon the material being polymerized in the pressure pot 13. In a specific embodiment, the temperature is in a range of from about 110°C to 160°C depending upon the synthetic material being employed. In this specific embodiment the temperature is set at about 120°C.

Control button 14 is then pressed to switch on the timing relay 49 by way of the line 51. Timing relay 49 activates magnetic valve 33 by way of line 52 into a position in which the valve 33 connects drain pipe 32 with the water-air-steam or main line 34. Consequently, water flows from the water container 28 into the water-air-steam line 34.

Magnetic valve 33 has two operating positions. In its first operating position, the magnetic valve 33 connects the water-air-steam line 34 to drain pipe 32. In its second operating position, the magnetic valve 33 connects the main, water-air-steam line 34 with the air-steam line or branch line 36. When the drain pipe 32 is connected to the water-air-steam line 34, water flows from the container 28 into the water-air-steam line 34. After a predetermined amount of time, for example about 3 seconds, when water has flowed into main line 34, the time relay 49 puts the magnetic valve 33 into its second position thereby connecting the air-steam or branch line 36 to the water-air-steam line 34. Simultaneously, the starting signal for time clock 21 is also given and brings the magnetic valve 41 into an operating position which links compressed-air line 43 to the air-steam or branch line 36. Thus, the air-steam line 36 has now the pressure of compressed air 43 connected thereto. Sometimes the pressure in branch line 36 may be diminished by the pressure drop occurring at the pressure reducer 42. Any water present in the water-air-steam or main line 34 is thereby injected into the pressure pot 13 where it evaporates when it is sprayed against the heated walls of the pressure pot 13. Needless to say, during this phase of the operation, drain pipe 32 and steam line 45 are turned off due to the positioning of magnetic valves 33 and 41, respectively.

The pressure which prevails in the pressure pot 13 is set and established by the pressure reducer 42 for a period of time which is established when the switch clock 21 has run out. The gauge pressure within the pressure pot 13 is from 4 to 6 atmospheres during another time period of about 10 minutes (referred to as the polymerization period). For the prevailing temperature and pressure conditions as described herein, an unsaturated water-vapor atmosphere is present in the pressure pot 13 to completely fulfill the desired purpose of polymerizing the molded dental pieces which have been placed within the pressure pot 13.

At the end of the polymerization period, magnetic valve 41 is put into its "other operating position" via line 53 whereby compressed air connection 43 is switched off and the air-steam line 36 is connected with the steam or exhausting line 45 via the distributor piece 37. Thus, the pressure in the pressure pot 13 can drop while the magnetic valve 41 is in this position. The water-air-steam line 34, the magnetic valve 33, the air-steam line 36, the distributor piece 37, magnetic valve 41, steam line 45 and pipe section 46 are all joined in series. Because of the flow resistances in the series connected lines, expansion within the system takes place sufficiently slowly so that after one or two seconds, depending upon size, equalization has been attained within the system. This can be read off on the pressure indicator 23. No steam can escape to the outside of the apparatus because it is taken up by the water container 28. Closing device 27 can then be manually operated to open lid 26. The molded piece which is now completely polymerized can now be removed from the pressure pot 13.

If the timing relay 49 is set at low values, then the water-air-steam line 34 is not completely filled up with water at first. This, however, does no harm and will not deleteriously affect the polymerization process. Conversely, no harm is done if the water-air-steam line 34 is somewhat overfilled.

The polymerization process of this invention may take place at temperatures below 130°C such as in a range from about 110°C to about 120°C. Consequently, the wall of the pressure pot 13 is maintained at the desired working temperature. If the water from the water container 28 arrives at a temperature of approximately 20°C, it is possible that the wall of the pressure pot 13 is not hot enough to cause the water to evaporate within a minimal time period. for this reason, a heating sleeve 54 is provided around the water-air-steam line 34 as shown in FIG. 2. The heating sleeve 54 has a sufficient size and such a connected value that the water enclosed in main line 34 may be heated considerably. In some instances, the water may already be evaporated by the heating sleeve 54 while it is still within the line 34 so that steam may be readily injected into the pressure pot 13.

It is within the contemplation of this invention to lead completely separate lines to pressure pot 13. For example, water could be conducted by a first line, compressed air could be conducted by a second line and steam could be conducted by a separate line. In such an instance, considerably more connections would be required at the pressure pot 13 and longer lines would be required and also more magnetic valves. By making two-fold and sometimes three-fold use of some lines, the assembly becomes much more compact. Fewer magnetic valves are required when the magnetic valves are used as two-way valves or reversing valves.

If water container 28 is arranged above the first magnetic valve 33 and above the main line 34, no additional feed pump is needed because the operation is by gravity. It is advantageous if a steam-return line 45 ends so that the outlet means 46 is above the liquid level of the container 28. Consequently there is adequate space for expansion, no liquid is stirred up by the return of the steam or entrained and the steam can then condense into the water disposed in the container 28. An intermediate expansion area is created between the pipe section 46 and the sheet or hose 48 so that the expansion of the steam takes place less suddenly. The same effect can be achieved through the use of a muffler device as discussed in the embodiment described hereinbelow.

It is helpful if the sheet 48 can be simply and inexpensively produced and if, moreover, the synthetic hose 48 is transparent, the state of the perforations 47 can always be checked.

It is advantageous if the flow regulator is located between the vessel and the reversing valve. This eliminates the admission of pressure to the flow regulator from behind. It is also helpful if a safety valve is situated in the interval between the reversing valves 33 and 41. Thus deviations from the desirable pressures are avoided if the lines are congested somewhere or if, for some reason, an exceedingly high pressure is building up in the pressure pot 13.

If the magnetic valve 33 is delayed with respect to the second magnetic valve 41, compressed air is prevented from passing water back into the water container 28 when magnetic valve 33 is not yet quite closed. When magnetic valves 33 and 41 are used as valves, they serve not only in the conventional manner as switches but might also be used as a heating mechanism. That is, the valves 33 and 41 have the property of becoming hot while they are operated and thus significant pre-heating of the fluids running therethrough can be accomplished.

The switch clock 21 is an advantageous expedient because it controls the duration of polymerization and automatically puts the second reversing valve 41 in its steam return position after termination of the polymerization period. The setting of the switch clock 21 corresponds exactly to the polymerization period and is not reduced by the water inflow period which lasts only a few seconds.

With interlocking, there is achieved for the working proccess of the apparatus the result that water cannot be injected again through a repeated activation of control button 14. After a simple touching of the button 14, the described processes take their course. They can be interrupted only by the activation of an emergency switch. The emergency switch controls the second magnetic valve 41 in the sense of pressure release.

After activation of the emergency switch, a start can be made again from the beginning by pressing button 14. It is advantageous if the flow regulator turns on the switch clock 21 after termination of the time of flow and if the flow regulator can be operated by a single switch button. Consequently, there is a simple sequence control the actions of which are synchronized with the processes within the apparatus.

For recycling the water vapor above the surface of the water in container 28, mufflers such as sintered metal mufflers may be used which have a length of only 1 to 2 centimeters. The apparatus of this invention makes it possible to polymerize completely, matrix-free synthetic dental molded pieces at temperatures of from about 110°C to 130°C or higher with complete reliability in operation and without danger to the user, with the aid of water vapor as a means for the transmission of heat in the generally desired short polymerization period of 10 minutes. The polymerized synthetic has high density, great hardness and no surface defects. It also retains its given color. It is within the contemplation of this invention that a simple press button valve may be employed in place of the operating time relay. The press button valve would be held down for a period of time long enough to allow the amount of water to be let in to the main line 34 from the container 28.

The embodiment as shown in FIGS. 5 through 8 includes a pressure pot 56 that is firmly mounted within the housing 55. A lid 57 is attached to a closing assembly which includes the hinge 58 and the mechanism 59. That is, the lid 57 may be pivoted between the closed position and an open position about the pivot point located at the hinge 58. A metal nut 60 is soldered onto the upper side of the lid 57 which is also composed of metal. A thermometer (not shown) can be screwed into the nut 60 to determine the temperature of the pressure pot 56.

Figure 6:
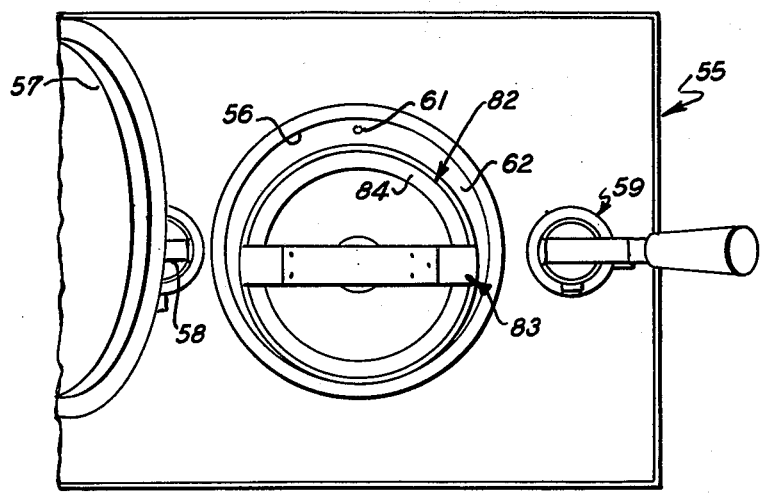
FIG. 6 is a top partial view of the apparatus of FIG. 5 with the lid open and the insertion device inserted.

As shown in FIG. 6, a bore hole 61 is located close to the edge of the bottom 62 of the pressure pot 56. The bore hole 61 first runs vertically downward and changes direction to run horizontally radially outwards with respect to the pressure pot 56. The bore hole 61 does not traverse the pressure pot bottom 62. The bore hole 61 is located approximately in the middle of the thickness of the bottom of the pressure pot 62.

Figure 7:
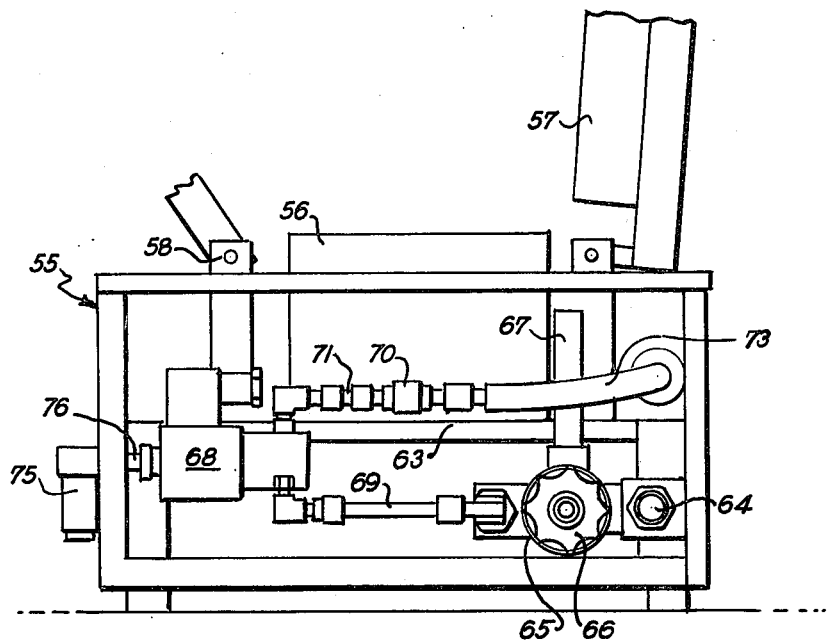
FIG. 7 is a rear elevational view of the apparatus of FIG. 5 having the rear wall thereof removed and the lid open.
Figure 8:
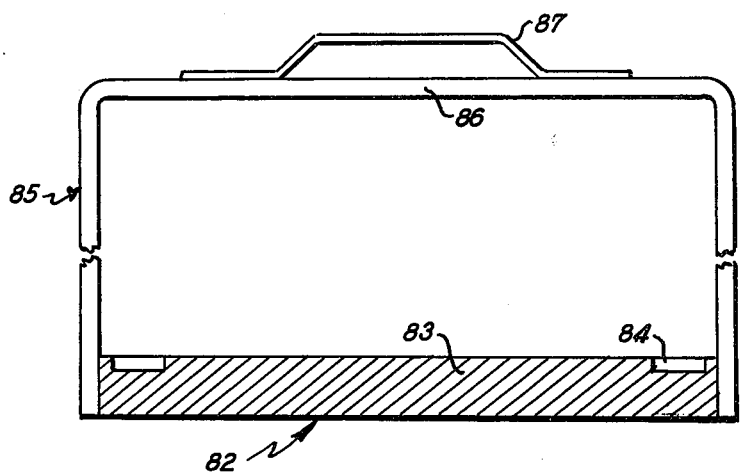
FIG. 8 is a partial vertical cross-sectional view through the insertion device of the apparatus of FIG. 5.

A heating plate 63 is mounted on the bottom 62 underneath the pressure pot 56 as shown in FIG. 7. The heating plate 63 is in good heat conduction relationship with respect to the bottom 62. The heating plate 63 has a suitable dimension with respect to the pressure pot 56 so that the interior of the pressure pot 56 can be brought to a temperature in the range from about 110°C to 160°C.

A compressed air connection 64 is disposed at the rear side of the housing 55. A pressure reducer 65 having a hand valve 66 is located downstream from the compressed air connection 64. The hand valve 66 is used to regulate the compressed air within the system so that it may be reduced to about four to five gauge atmospheres. A safety valve 67 is also connected to the pressure reducer 65.

A two-way magnetic valve 68 is connected to the pressure reducer 65 via the connecting line 69. The magnetic valve 68 is also connected to the nipple 70 leading to the bore hole 61 by way of the connecting line 71.

A pressure gauge 72 is mounted in the frontal plate 74 of the housing 55. The pressure gauge 72 is connected to the nipple 70 leading to the bore hole 61 by way of the pressure gauge line 73 so that the prevailing pressure in the pressure pot 56 is always determinable. That is, the pressure gauge 72 indicates the pressure prevailing in the pressure pot 56 regardless of whether the lid 57 is open or closed, whether the device is disconnected, etc.

The magnetic valve 68 is connected at a third location to a small muffler 75 by way of the muffler connecting line 76. The muffler connecting line 76 traverses the housing 55 and the small muffler 75 is mounted laterally on the outside of the housing 55.

A temperature selection or control button 77 is mounted on the housing 55 to adjust the thermostat (not shown) which monitors the temperature in the pressure pot 56. The indicating lamp 78 mounted on the frontal plate 74 indicates the operation of the thermostat. Through the use of the thermostat, the temperature in the pressure pot 56 may be set at the desired temperature which is generally in the range from 110°C to 130°C.

A time-switch clock 80 is mounted in the frontal plate 74 and may be set for time intervals between 0 and 30 minutes. The time-switch clock 80 electrically controls the magnetic valve 68 in a manner described hereinbelow. The indicating lamp 81 glows when the time-switch clock 80 is operating. The electric switch 79 mounted in the frontal plate 74 is used to turn the heating on and off.

An insertion device 82 constituting a specimen container includes a U-shape rack or bracket, generally designated 85, which constitutes a handle portion and is fastened to a circular metal bottom 83. The bracket 85 includes a cross bar 86 and a flat U-shaped cover plate 87 which is usable as a handle. The dimensions of the insert or specimen container 82 have been so designed that it may be fit entirely within the pressure pot 56 with the lid 57 closed.

The lower side of the circular bottom 83 is very flat and thus can rest with good heat conduction on the upper side of the pressure pot bottom 62 which is also very flat. The insert bottom 83 has a sufficient thickness so that it will not bend too much when the heating plate 63 is heated. As is well known in the case of better quality bottoms, the metal bottom 83 is sometimes withdrawn toward the middle thereof so that it touches the pressure pot bottom 62 completely only when the ultimate desired temperature is attained. The objects to be polymerized, the fastening clamps, etc. are placed in the middle of the upper side of the metal bottom 83.

An annular slot 84 constitutes at least one recess that is located at the edge of the upper side of the bottom 83 and is open at the top thereof. The slot 84 has a volume effective to hold a sufficient amount of water which is necessary to generate a water vapor unsaturated atmosphere within the pressure pot 56 when the lid 57 is closed. Thus, there is never enough water placed inside the pressure pot 56 which would be required to generate super-heated steam.

The apparatus as shown in the embodiment of FIGS. 5 through 8 operates as follows:

Electrical switch 79 is turned on and the temperature selector 77 electrically sets the thermostat (not shown) to the selected temperature. The lid 57 may be open or closed during this preliminary procedure. The thermostat indicating lamp 78 glows while the heating plate 63 is heating up to temperature and goes off when the desired temperature has been reached.

The objects to be polymerized are placed on the bottom 83 of the insert or specimen container 82. The annular slot 84 is filled to the brim with water while the insert bottom 83 is cold. Once the pressure pot 56 has been heated up to the desired temperature, the insert or specimen container 82 is placed therein and the lid 57 is closed tightly with the locking mechanism 59.

The time-switch clock 80 is now set to the desired polymerization period which is about ten minutes in most cases. The time-switch clock 80 may be any standard type of timer mechanism including a clockwork which is wound up. When the time-switch clock 80 is wound up, the indicating lamp 81 glows. During the polymerization period while the switch clock 80 is operating, the magnetic valve 68 is in a first operating position which connects the compressed air to the pressure pot 56 by way of connecting lines 69 and 71 into the nipple 70 and bore hole 61. The rise in pressure which occurs within the pressure pot 56 can be read from the pressure gauge 72. The pressure prevailing in the pressure pot 56 is established manually by turning the hand control valve 66 which operates the pressure reducer 65. Thus, the pressure prevailing in the pressure pot 56 is not determined by the evaporation of the water present in the annular slot 84.

When the time-switch clock 80 reaches its initial setting, the indicating lamp 81 goes out and the magnetic valve 68 which is electrically controlled by the clock 80 is reversed. That is, the connecting line 69 is disconnected and the muffler connecting line 76 is connected to the inside of the pressure pot 56 by way of the bore hole 61 and connecting line 71. Thus, the pressure inside the pressure pot 56 is conducted to the outside atmosphere by way of the muffler 75 with only a very brief, weak hissing sound.

Instead of having an annular slot 84, it is within the contemplation of the invention to use a small measuring vessel containing the required amount of water set up on the metal bottom 83. For a pressure pot capacity of 1 liter, the amount of water to be put into the pressure pot 56 in this embodiment is 1 cm³. The slot 84 defines a container having a volume corresponding to the sufficient amount of water which, with respect to the volume of the chamber minus the volume of pieces present within the chamber, and with respect to the pressure within said chamber, is effective to form the desired unsaturated water vapor atmosphere. The container may be constructed as a recess, a depression, a blind hole or be in the form of several bore holes.

There are several advantages associated with this embodiment of the invention. Due to the automatic pressure relief of the device after termination of the polymerization period, accidents are eliminated. Only an unsaturated water vapor atmosphere is generated within the polymerization chamber. Thus, the synthetic material will absorb sufficient water to avoid later subsequent swelling in the mouth of the patient during its polymerization. A sudden after evaporation with an explosion-like effect will not occur when the lid 57 is opened because there is no additional unevaporated amount of water present in the system. It is not necessary to wait to let the apparatus cool off under pressure at the end of the polymerization period. Consequently, the amount of time required to effectuate the total operating procedure is kept to an absolute minimum.

It is clear that the polymerization of the synthetic material takes place in a water vapor atmosphere under pressure and heat so that the water vapor atmosphere is unsaturated. To avoid calcareous deposit in the polymerization chamber and the water feeding and deriving line, stead of tap-water, distilled water can be used.

While the method and apparatus for polymerizing molded dental pieces have been shown and described in detail, it is obvious that this invention is not to be considered as being limited to the exact form disclosed, and that changes in detail and construction may be made therein within the scope of the invention, without departing from the spirit thereof.

I claim:

1. An apparatus useful for the matrix free polymerization of molded dental pieces comprising:
    a. a hermetically sealable polymerization chamber,
    b. means for raising the pressure within the chamber after it has been hermetically sealed,
    c. means for elevating the temperature within the chamber,
    d. means for supplying a sufficient amount of water in the polymerization chamber to form an unsaturated water vapor atmosphere in the chamber after it has been hermetically sealed under increased temperature and pressure,
    e. means for exhausting the chamber after effecting polymerization for a predetermined amount of time while the chamber remains hermetically sealed, and
    f. means for providing a flow of fluid into and out of the chamber after it has been hermetically sealed.

2. An apparatus as defined in claim 1 wherein said fluid flow means includes a time-control flow regulator means.

3. An apparatus useful for the matrix free polymerization of molded dental pieces comprising:
    a. a hermetically sealable polymerization chamber,
    b. means for raising the pressure within the chamber after it has been hermetically sealed,
    c. means for elevating the temperature within the chamber,
    d. means for supplying a sufficient amount of water in the polymerization chamber to form an unsaturated water vapor atmosphere in the chamber after it has been hermetically sealed under increased temperature and pressure,
    e. means for exhausting the chamber after effecting polymerization for a predetermined amount of time while the chamber remains hermetically sealed, and
    f. means for providing a flow of fluid into and out of the chamber after it has been hermetically sealed,
    g. said pressure raising means includes a compressed air source connected to the fluid flow means having a compressed air line.

4. An apparatus as defined in claim 3 wherein said fluid flow means includes a time controlled flow regulator means and an interrupter valve which is controllable by the time control of said flow regulator means.

5. An apparatus useful for the matrix free polymerization of molded dental pieces comprising:
    a. a hermetically sealable polymerization chamber, b. means for raising the pressure within the chamber after it has been hermetically sealed,
c. means for elevating the temperature within the chamber,
d. means for supplying a sufficient amount of water in the polymerization chamber to form an unsaturated water vapor atmosphere in the chamber after it has been hermetically sealed under increased temperature and pressure,
e. means for exhausting the chamber after effecting polymerization for a predetermined amount of time while the chamber remains hermetically sealed, and
f. means for providing a flow of fluid into and out of the chamber after it has been hermetically sealed,
g. said exhausting means includes an outlet means connected to the fluid flow means having a steam return line.

6. An apparatus as defined in claim 5 wherein said fluid flow means includes a timed controlled flow regulator means and an interrupter valve which is controllable by the time control of said flow regulator means.

7. An apparatus useful for the matrix free polymerization of molded dental pieces comprising:
a. a hermetically sealable polymerization chamber,
b. means for raising the pressure within the chamber after it has been hermetically sealed,
c. means for elevating the temperature within the chamber,
d. means for supplying a sufficient amount of water in the polymerization chamber to form an unsaturated water vapor atmosphere in the chamber after it has been hermetically sealed under increased temperature and pressure,
e. means for exhausting the chamber after effecting polymerization for a predetermined amount of time while the chamber remains hermetically sealed, and
f. means for providing a flow of fluid into and out of the chamber after it has been hermetically sealed,
g. said pressure raising means includes a compressed air source connected to the fluid flow means having a compressed air line,
h. said exhausting means includes an outlet means connected to the fluid flow means having a steam return line,
i. said fluid flow means includes a time controlled flow regulator means and at least one reversing interrupter valve which is controllable by the time control of the said flow regulator means to sequentially connect said pressure raising means and said exhausting means to the polymerization chamber.

8. An apparatus useful for the matrix free polymerization of molded dental pieces comprising:
a. a hermetically sealable polymerization chamber,
b. means for raising the pressure within the chamber after it has been hermetically sealed,
c. means for elevating the temperature within the chamber,
d. means for supplying a sufficient amount of water in the polymerization chamber to form an unsaturated water vapor atmosphere in the chamber after it has been hermetically sealed under increased temperature and pressure,
e. means for exhausting the chamber after effecting polymerization for a predetermined amount of time while the chamber remains hermetically sealed, and
f. means for providing a flow of fluid into and out of the chamber after it has been hermetically sealed,
g. said water supplying means includes a container defining a volume corresponding to said sufficient amount of water which, with respect to the volume of the chamber minus the volume of pieces present within the chamber, and with respect to the pressure within said chamber, is effective to form said water vapor atmosphere.

9. An apparatus as defined in claim 8 wherein said container is in good heat conduction contact with said chamber.

10. An apparatus as defined in claim 8 wherein said container is composed of metal.

11. An apparatus useful for the matrix free polymerization of molded dental pieces comprising:
a. a hermetically sealable polymerization chamber,
b. means for raising the pressure within the chamber after it has been hermetically sealed,
c. means for elevating the temperature within the chamber,
d. means for supplying a sufficient amount of water in the polymerization chamber to form an unsaturated water vapor atmosphere in the chamber after it has been hermetically sealed under increased temperature and pressure,
e. means for exhausting the chamber after effecting polymerization for a predetermined amount of time while the chamber remains hermetically sealed, and
f. means for providing a flow of fluid into and out of the chamber after it has been hermetically sealed,
g. said chamber includes an insertion device including a bottom portion for supporting said molded pieces and a handle portion attached to said bottom portion,
h. said water supplying means includes at least one recess in the bottom portion for containing said sufficient amount of water.

12. An apparatus as defined in claim 11 wherein said recess has the shape of an outer annular slot formed on the top surface of the bottom portion, said slot having an upper edge which forms a mark at such a distance from the bottom of the recess slot to define said desired volume for providing said sufficient amount of water,
said bottom portion being sufficiently large to cover the major portion of the bottom of said polymerization chamber.

13. An apparatus as defined in claim 8 wherein said container is constructed as a recess, a depression, a blind hole or in the form of several bore holes.

14. An apparatus useful for the matrix free polymerization of molded dental pieces comprising:
a. a hermetically sealable polymerization chamber,
b. means for raising the pressure within the chamber after it has been hermetically sealed,
c. means for elevating the temperature within the chamber,
d. means for supplying a sufficient amount of water in the polymerization chamber to form an unsaturated water vapor atmosphere in the chamber after it has been hermetically sealed under increased temperature and pressure, e. means for exhausting the chamber after effecting polymerization for a predetermined amount of time while the chamber remains hermetically sealed, and
f. means for providing a flow of fluid into and out of the chamber after it has been hermetically sealed,
g. said water supplying means includes a water container disposed outside said chamber and
h. said fluid flow means includes a time controlled flow regulator means.

15. An apparatus as defined in claim 14 wherein said fluid flow means includes an interrupter valve which is controllable by the time-control of said flow regulator means.

16. An apparatus as defined in claim 14 wherein said exhausting means includes an outlet means located in said water container and connected to the fluid flow means having a steam return line.

17. An apparatus as defined in claim 16 wherein said outlet means is disposed above the liquid surface in said water container.

18. An apparatus as defined in claim 16 wherein said outlet means includes a sintered metal muffler located in the water container through which the atmosphere of the polymerization is directed at the termination of the polymerization period.

19. An apparatus as defined in claim 16 wherein said outlet means includes a perforated pipe section that runs above the liquid surface located in said water container and a sleeve member that is open at least at one end and covers said pipe section.

20. An apparatus as defined in claim 19 wherein said sleeve member is composed of a synthetic material and is in the form of a hose section which slips over said pipe section.

21. An apparatus useful for the matrix free polymerization of molded dental pieces comprising:
a. a hermetically sealable polymerization chamber,
b. means for raising the pressure within the chamber after it has been hermetically sealed,
c. means for elevating the temperature within the chamber,
d. means for supplying a sufficient amount of water in the polymerization chamber to form an unsaturated water vapor atmosphere in the chamber after it has been hermetically sealed under increased temperature and pressure,
e. means for exhausting the chamber after effecting polymerization for a predetermined amount of time while the chamber remains hermetically sealed, and
f. means for providing a flow of fluid into and out of the chamber after it has been hermetically sealed,
g. said water supplying means includes a water container disposed at a location laterally spaced from said polymerization chamber,
h. said fluid flow means includes at least one reversing interrupter valve and a main line extending from the polymerization chamber to said reversing interrupter valve which includes two intake connections,
i. one of said intake connections being attached to said water container and the other said intake connection being attached to a compressed air source.

22. An apparatus as defined in claim 21 wherein said fluid flow means includes a flow regulator means which is electrically connected to said reversing interrupter valve,
said flow regulator means being effective to connect the main line sequentially to the first intake connection and then to the second intake connection by activating the reversing interrupter valve between two operating positions.

23. An apparatus useful for the matrix free polymerization of molded dental pieces comprising:
a. a hermetically sealable polymerization chamber,
b. means for raising the pressure within the chamber after it has been hermetically sealed,
c. means for elevating the temperature within the chamber,
d. means for supplying a sufficient amount of water in the polymerization chamber to form an unsaturated water vapor atmosphere in the chamber after it has been hermetically sealed under increased temperature and pressure,
e. means for exhausting the chamber after effecting polymerization for a predetermined amount of time while the chamber remains hermetically sealed, and
f. means for providing a flow of fluid into and out of the chamber after it has been hermetically sealed,
g. said water supplying means includes a water container disposed at a location outside said polymerization chamber,
h. said fluid flow means includes a flow regulator means, two reversing interrupter valves, a compressed air line, a branch line and a main line extending from the polymerization chamber to a first said reversing interrupter valve which includes two intake connections,
i. one of said intake connections being attached to said water container and the other said intake connection being attached to said compressed air line,
j. said pressure raising means includes a compressed air source connected to the compressed air line,
k. a second said reversing interrupter valve being disposed within said compressed air line and including a first intake connection from said compressed air source, a second connection to said branch line extending to said first reversing interrupter valve and a third connection to said exhausting means,
l. said first and second reversing interrupter valves being controllable by the time-control of said flow regulator means.

24. An apparatus as defined in claim 23 wherein said fluid flow means includes a retardation device which delays the reversing of the second reversing valve with respect to the first reversing valve.

25. An apparatus as defined in claim 23 wherein said fluid flow means includes an interlocking device which, after initial switching on of the apparatus, prevents a second switching on until the moment of steam return.

26. An apparatus as defined in claim 23 wherein said fluid flow means includes an emergency switch which is provided for the initiation of pressure release at any time during the operation of the apparatus.

27. An apparatus as defined in claim 23 wherein said fluid flow means includes a flow regulator means, a switch clock and a switch button which are electrically connected with respect to each other, said fluid regulator means, after termination of the time of flow, switch clock being switched on and the flow regulator means being activatable by said switch button.

28. An apparatus as defined in claim 23 wherein said flow regulator means controls the working position of said first and second reversing interrupter valves whereby when said first interrupter valve is positioned to open the flow from the water container into the main line, the compressed air line is closed, after a predetermined amount of time, the first interrupter valve is positioned to close the flow from the water container and open the main line in connection with said compressed air line which includes the second reversing interrupter valve in a first position connected to said compressed air source, and after a predetermined time interval for introducing compressed air into the chamber, the flow regulator means changes the position of the said second reversing interrupter valve to open said main branch and compressed air line now to the exhausting means while the chamber is hermetically sealed.

29. An apparatus useful for the matrix free polymerization of molded dental pieces comprising:
 a. a hermetically sealable polymerization chamber,
 b. means for raising the pressure within the chamber after it has been hermetically sealed,
 c. means for elevating the temperature within the chamber,
 d. means for supplying a sufficient amount of water in the polymerization chamber to form an unsaturated water vapor atmosphere in the chamber after it has been hermetically sealed under increased temperature and pressure,
 e. means for exhausting the chamber after effecting polymerization for a predetermined amount of time while the chamber remains hermetically sealed, and
 f. means for providing a flow of fluid into and out of the chamber after it has been hermetically sealed,
 g. said fluid flow means includes a flow regulator means having a time-switch clock which controls the duration of the polymerization in said chamber and activates the exhausting means after termination of the polymerization,
 h. said water supplying means, the pressure raising means and the exhausting means being sequentially operated in the order as stated by said flow regulator means.

30. An apparatus as defined in claim 3 wherein said water supplying means includes means for heating said water before it enters the polymerization chamber.

31. An apparatus useful for the matrix free polymerization of molded dental pieces comprising:
 a. a hermetically sealable polymerization chamber,
 b. means for raising the pressure within the chamber after it has been hermetically sealed,
 c. means for elevating the temperature within the chamber,
 d. means for supplying a sufficient amount of water in the polymerization chamber to form an unsaturated water vapor atmosphere in the chamber after it has been hermetically sealed under increased temperature and pressure,
 e. means for exhausting the chamber after effecting polymerization for a predetermined amount of time while the chamber remains hermetically sealed, and
 f. means for providing a flow of fluid into and out of the chamber after it has been hermetically sealed,
 g. said exhausting means includes a muffler device through which the atmosphere of the polymerization chamber is directed at the termination of the polymerization period.

32. A method for polymerizing molded dental pieces comprising:
 a. placing said molded dental pieces into a hermetically sealable polymerization chamber,
 b. elevating the temperature within said chamber,
 c. raising the pressure within said chamber after it has been hermetically sealed,
 d. supplying a sufficient amount of water in the polymerization chamber to form an unsaturated water vapor pressure in the chamber after it has been hermetically sealed under increased temperature and pressure, and
 e. exhausting the atmosphere of the chamber after effecting polymerization while the chamber remains hermetically sealed.

33. A method as defined in claim 32 wherein said water is supplied in the polymerization chamber before the chamber has been hermetically sealed.

34. A method as defined in claim 32 wherein said water is supplied in the polymerization chamber after the chamber has been hermetically sealed.

35. A method as defined in claim 32 wherein said water is supplied in the polymerization chamber before the chamber has been hermetically sealed and before the pressure is raised in the chamber.

* * * * *